J. T. COMPTON.
FRUIT PICKER'S BUCKET.
APPLICATION FILED DEC. 2, 1910.

1,012,602.

Patented Dec. 26, 1911.
2 SHEETS—SHEET 1.

Witnesses

Inventor
J. T. Compton
By ____, Attorneys

J. T. COMPTON.
FRUIT PICKER'S BUCKET.
APPLICATION FILED DEC. 2, 1910.
1,012,602.
Patented Dec. 26, 1911.
2 SHEETS—SHEET 2.
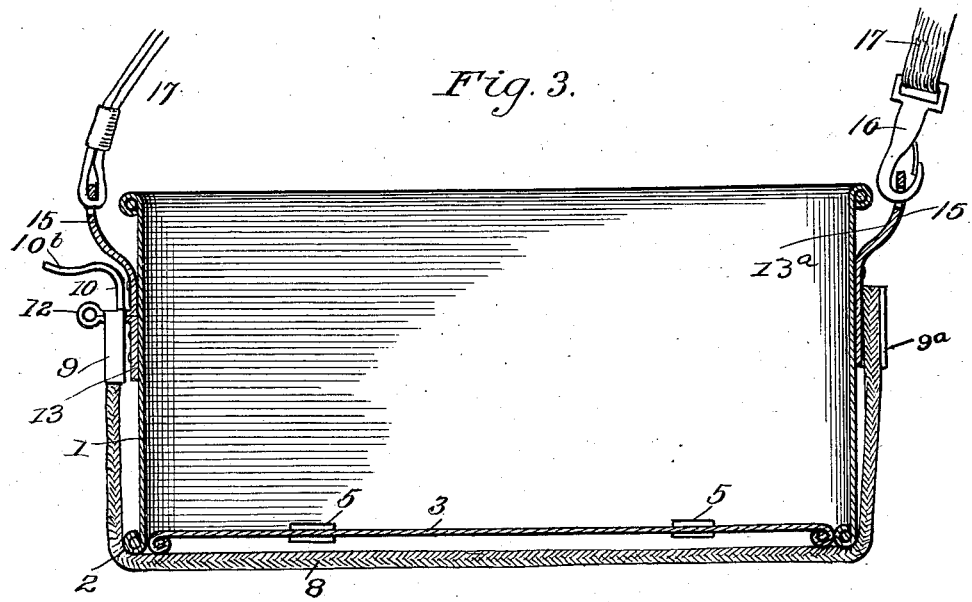
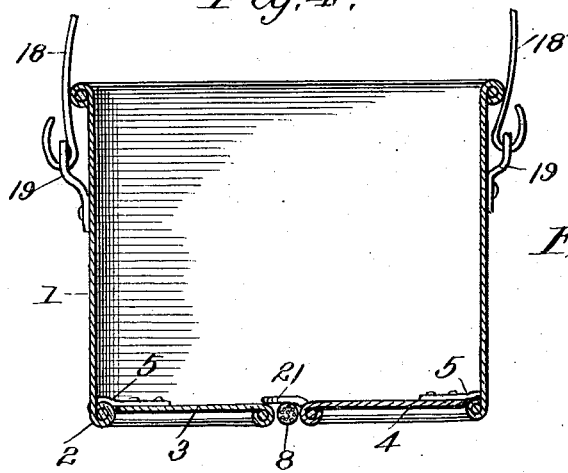
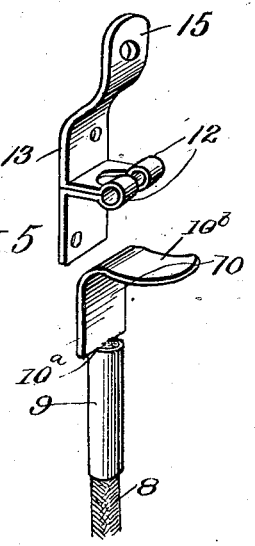
Inventor
J. T. Compton

UNITED STATES PATENT OFFICE.

JAMES T. COMPTON, OF WENATCHEE, WASHINGTON, ASSIGNOR OF ONE-HALF TO FRANK L. GLADISH, OF WENATCHEE, WASHINGTON.

FRUIT-PICKER'S BUCKET.

1,012,602. Specification of Letters Patent. Patented Dec. 26, 1911.

Application filed December 2, 1910. Serial No. 595,262.

*To all whom it may concern:*

Be it known that I, JAMES T. COMPTON, citizen of the United States, residing at Wenatchee, in the county of Chelan and State of Washington, have invented certain new and useful Improvements in Fruit-Pickers' Buckets, of which the following is a specification.

This invention comprehends certain new and useful improvements in buckets or receptacles for use in picking fruit, and the invention has for its primary object an improved device of this character which will be characterized by simplicity of construction and efficiency in operation, in which the parts are so arranged that the fruit may be emptied from the bottom of the bucket, thereby avoiding all bruising of the fruit by pouring the same out, or unnecessary handling of the fruit, and which will be so constructed that the bucket may be emptied with a minimum loss of time and with very little effort. And the invention also has for its object to generally improve this class of devices and to render them more useful and commercially desirable.

With these and other objects in view as will more fully appear as the description proceeds, the invention consists in certain constructions, arrangements and combinations of the parts that I shall hereinafter fully describe and claim.

Figure 1:
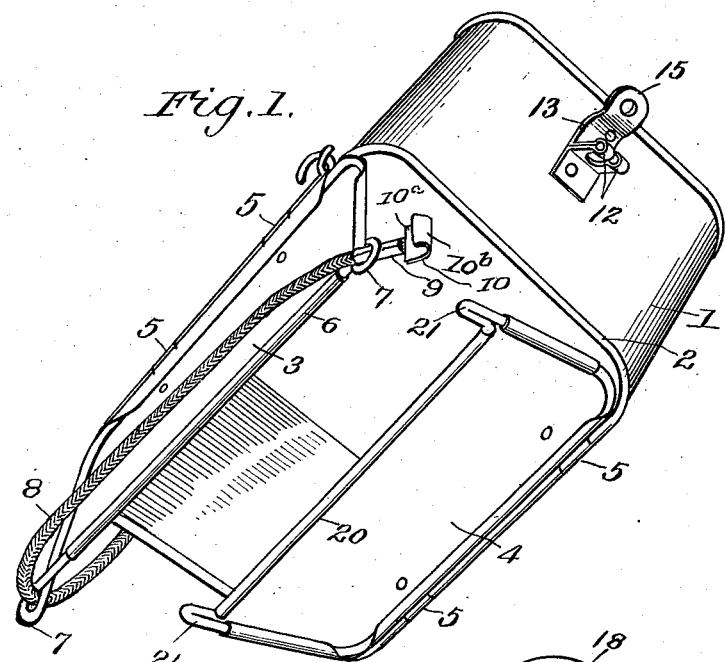
Figure 2:
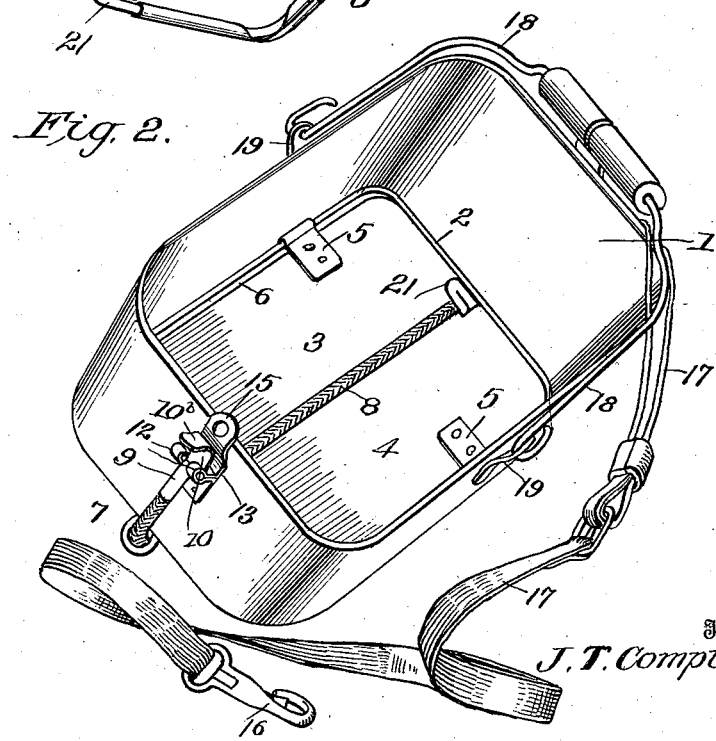

For a full understanding of the invention reference is to be had to the following description and accompanying drawing, in which:

Figure 1 is a bottom perspective view of my improved fruit picker's bucket; Fig. 2 is a top perspective view thereof; Fig. 3 is a longitudinal sectional view of the device; Fig. 4 is a transverse sectional view; and, Fig. 5 illustrates the latch and the keeper designed to co-act therewith.

Corresponding and like parts are referred to in the following description and indicated in all the views of the drawing by the same reference characters.

The main parts of my improved picking bucket are preferably composed of sheet metal and comprise a body portion 1 which in the present instance is substantially rectangular in shape with relatively long sides and relatively short ends. The body portion is preferably wired around the upper and lower edges so as to reinforce it, the lower wire designated 2 serving as the direct support for the bottom of the device which is divided longitudinally into two corresponding sections, the same being designated 3 and 4 respectively. In the present instance, the sections 3 and 4 are pivotally connected at their outer side edges to the wire 2 as by strap hinges 5, as clearly illustrated in the drawing.

The sections 3 and 4 which together compose the bottom of the bucket are each composed of sheet metal, and the section 3 is wired around its marginal edge, as indicated at 6. At the free corners of the section 3, the wire 6 is looped upon itself to form eyes 7 designed to receive a flexible binding member 8 having a running engagement therewith. One end of the binding member 8 (which member may be of rope) has secured to it a preferably metallic sleeve 9 on which a latch 10 is formed, the said latch being designed to be slipped over lugs 12 which form part of a keeper 13. The keeper 13 is secured to one end of the body portion 1 of the bucket, and is preferably formed of a strip of sheet metal riveted or otherwise secured to the bucket and crimped intermediate of its ends to form the laterally spaced lugs 12, said lugs being designed to receive between them the sleeve 9 of the latch 10, when the shoulders 10ª of the latch are in engagement with the lugs. The latch 10 is curved or angularly formed, as shown so that its upper end will form a finger piece 10ᵇ by which the latch may be easily manipulated. The other end of the binding member 8 is secured to a sleeve 9ª forming part of a plate 13ª riveted or otherwise secured to the end of the bucket opposite the end where the keeper 13 is located.

If desired, the strip of metal 13 and the part 13ª may be extended outwardly and upwardly at their upper ends to form apertured ears 15 designed for engagement by snap hooks 16 secured to the ends of an adjustable shoulder strap 17 by which the device may be carried over the shoulder of the operator.

The bucket may also be equipped with an ordinary swinging bail 18 secured to the ears 19 on opposite sides of the body portion, so that the bucket may be carried suspended from one's hand.

The wire 20 which binds the edge of the bottom section 4 is crimped at the free corners of said section, as indicated at 21, and is designed to overlie the adjoining corners of the section 3 when the two sections are in closed position, so that the section 4 is not only held closed by the section 3, but also by the binding member 8 which extends along the meeting edges of the sections and underneath the crimps 21, which manifestly constitute retaining lugs for holding the section 4 in closed position.

From the foregoing description in connection with the accompanying drawing, the operation of my improved fruit picker's bucket will be apparent.

In the practical use of the device, the bottom sections 3 and 4 are held closed by the engagement of the latch 10 with the lugs 12 of the keeper 13. After the bucket has been filled to the desired extent, the contents may be easily discharged through the bottom by releasing the latch 10 and permitting the bottom sections 3 and 4 to swing downwardly to open position, the bucket being thereby emptied without the necessity of pouring the fruit out and without the necessity of picking it out by hand.

It will thus be seen that I have provided a very simple and efficient device for use by fruit pickers which may expedite the fruit picking operation and which will save all unnecessary handling of the fruit which might tend to bruise it.

Having thus described the invention, what is claimed is:

1. A bucket of the character described, comprising a body portion, hinged bottom sections connected thereto, one of said sections being formed with a marginal binding wire which is looped upon itself at the free corners of such section to form eyes, means for effecting the support of one section by the other with the sections in closed position, a flexible binding member having a running connection through said eyes, means for connecting one end of said binding member to the body portion, a keeper secured to the body portion, and a latch secured to the other end of the binding member and arranged for detachable connection with said keeper.

2. A bucket of the character described, comprising a body portion, hinged bottom sections connected thereto, one of said sections being formed with a marginal binding wire which is looped upon itself at the free corners of such section, to form eyes, the other section being provided with a marginal binding wire crimped upon itself at the free corners of said section to form retaining lugs adapted to be overlapped by the first-named section in the closed position of the sections, and a flexible binding member having running connection with the said eyes and arranged for detachable connection to the body portion.

3. A bucket of the character described, comprising a body portion, hinged bottom sections connected thereto, one of said sections being provided with a marginal binding wire crimped upon itself at the free edge of said section to form retaining lugs adapted to be overlapped by the other section in the closed position of the sections, and a flexible binding member having running connection with such other section and arranged for detachable connection to the body portion.

In testimony whereof, I affix my signature in presence of two witnesses.

JAMES T. COMPTON. [L. S.]

Witnesses:
H. F. HUBBARD,
W. F. CLAY.

---

Copies of this patent may be obtained for five cents each, by addressing the "Commissioner of Patents, Washington, D. C."